US009009752B2

(12) United States Patent
Jing et al.

(10) Patent No.: US 9,009,752 B2
(45) Date of Patent: *Apr. 14, 2015

(54) SOCIAL NETWORKING AND PEER TO PEER FOR TVS

(71) Applicants: Sony Corporation, Tokyo (JP); Sony Electronics Inc., Park Ridge, NJ (US)

(72) Inventors: Xiangpeng Jing, San Diego, CA (US); Aixin Liu, San Diego, CA (US); Djung N. Nguyen, San Diego, CA (US); Abhishek Patil, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/274,449

(22) Filed: May 9, 2014

(65) Prior Publication Data
US 2014/0298373 A1 Oct. 2, 2014

Related U.S. Application Data

(63) Continuation of application No. 12/332,584, filed on Dec. 11, 2008, now Pat. No. 8,863,173.

(51) Int. Cl.
*H04N 7/16* (2011.01)
*H04N 21/61* (2011.01)
*H04L 12/28* (2006.01)
*H04N 21/4788* (2011.01)
*H04N 21/63* (2011.01)
*H04L 29/08* (2006.01)
*H04N 21/81* (2011.01)

(52) U.S. Cl.
CPC ........ *H04N 21/6175* (2013.01); *H04L 12/2812* (2013.01); *H04L 2012/2849* (2013.01); *H04N 21/4788* (2013.01); *H04N 21/632* (2013.01); *H04L 67/104* (2013.01); *H04N 21/812* (2013.01); *H04L 2201/08* (2013.01)

(58) Field of Classification Search
CPC .............. H04N 21/4532; H04N 7/163; H04N 21/4542; H04N 21/4755; H04N 21/454
USPC ........................................... 725/28; 380/211
See application file for complete search history.

*Primary Examiner* — Benjamin R Bruckart
*Assistant Examiner* — Anthony Bantamoi
(74) *Attorney, Agent, or Firm* — John L. Rogitz

(57) ABSTRACT

A peer-to-peer (P2P) application which can be applied to TVs. The P2P application promotes a social networking aspect by allowing devices connecting to either the home mesh network and/or Internet to share contents and create common-interest channels. The P2P application does not require support from network infrastructure (e.g., no central servers), and consequently is extremely cost-effective and easy to deploy. The distributed nature of this system allows users to join or leave the network at will. It takes advantage of the local home mesh network connectivity, or existing Internet connections. A participant that tunes into a broadcast on an Internet channel is not only downloading a video stream, but also uploading it to other participants watching the program. Data mining systems capture user preferences and create personalized Internet channels on the TV using the P2P network.

12 Claims, 2 Drawing Sheets

SOCIAL NETWORKING AND PEER TO PEER FOR TVS

I. FIELD OF THE INVENTION

The present invention relates generally to social networking and peer to peer communication using TV systems.

II. BACKGROUND OF THE INVENTION

TV systems are becoming increasingly capable, allowing customers to not only enjoy traditional TV programming but also to undertake some tasks that previously were considered to be computer-based. As understood herein, certain of these tasks can be executed by TV systems to increase the enjoyment and experience of interacting with the system. Among such tasks, as recognized herein, are social networking with other peer households having appropriate systems.

SUMMARY OF THE INVENTION

A TV system includes a processor accessing a tangible computer readable medium to execute a peer-to-peer (P2P) application promoting a social network by allowing a TV device connecting to either a home network and/or Internet to share content and create common-interest channels with TV systems outside the home network using P2P communication such that support from centralized servers for hosting content is not required. The P2P application allows users to join or leave the social network at will. A participant hosting video content from the local home network or tuning into a broadcast via an Internet channel received by the TV system receives a video, stream and also uploads the video stream using P2P communication to other participants in the social network to facilitate the other participants downloading or watching the program.

The processor may be in a TV or in a set box housed separately from a TV and connected thereto. In some embodiments the processor can access a data mining engine to generate targeted vide content and advertising based on output from the data mining engine, with the engine receiving user channel and web site selections. A relationship can exist between user selections and the P2P social network in that P2P user preferences are captured and shared in a distributed P2P network. TV systems connecting to a wide area computer network automatically seek other P2P-enabled TV systems and in concert therewith build/join an infrastructureless P2P social network, such that no explicit Internet servers are required to maintain the social network.

In another aspect, a TV system includes a processor accessing a tangible computer readable medium to connect to a wide area computer network and automatically seek peer-to-peer (P2P)-enabled TV systems and in concert therewith build/join an infrastructureless P2P social network, such that no explicit Internet servers are required to maintain the social network.

In another aspect, a TV system includes a processor accessing a tangible computer readable medium to detect that the system is connected to a network and to execute peer-to-peer (P2P) discovery of other TV systems using P2P network discovery. The processor also uses a P2P framework to establish a social P2P network with other TV systems to share video/audio contents, create personalized channels and help to distribute audio video content.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
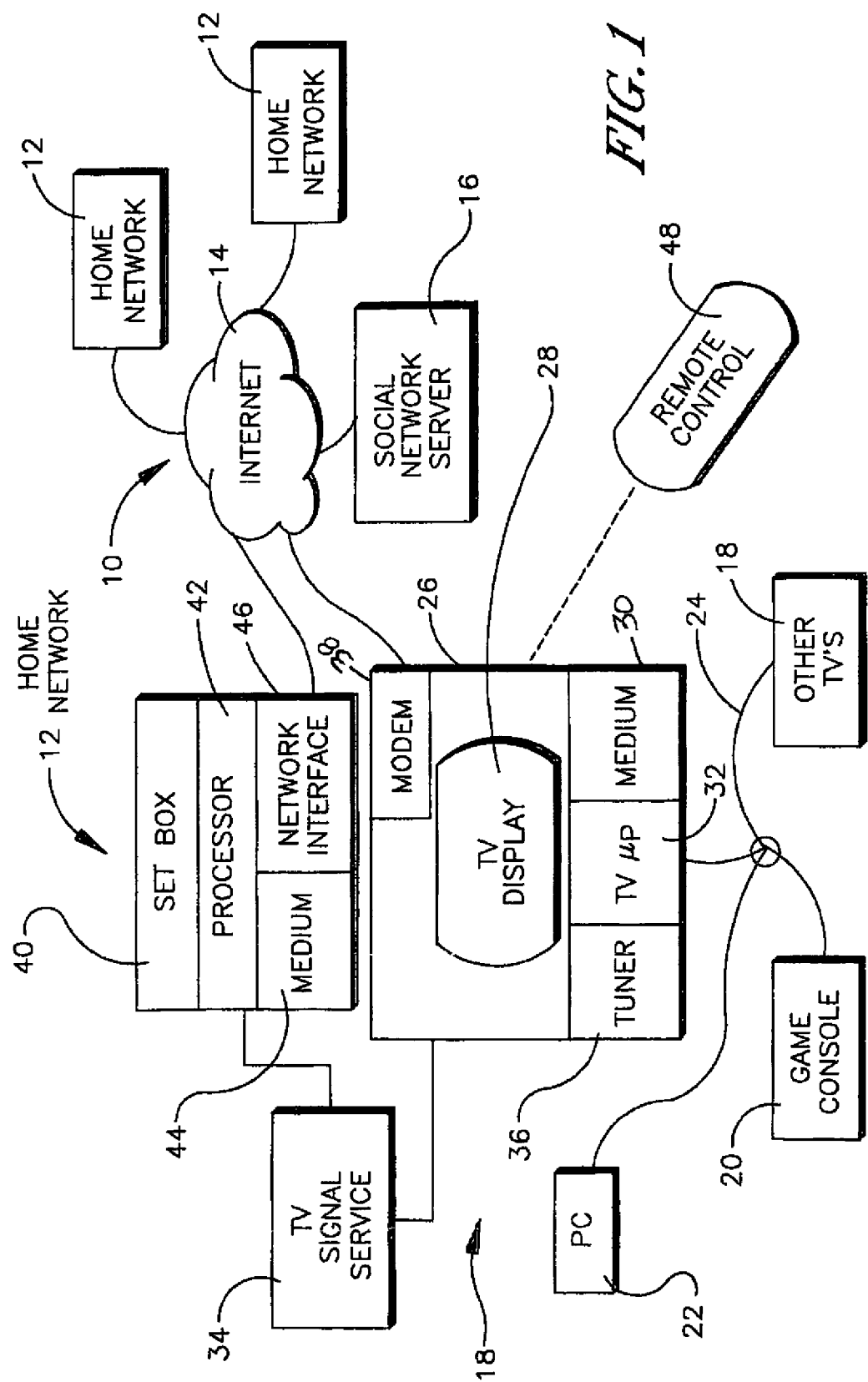
FIG. 1 is a schematic block diagram of an example system.

Referring initially to FIG. 1, a system is shown, generally designated 10, that includes multiple home networks 12 communicating with each other using peer to peer (P2P) principles over a wide area network 14 such as the Internet or a community "mesh" network. Existing social networking websites or servers 16 may also communicate with the wide area network 14.

An example home network 12 can include one or more TV systems 18 communicating with each other and with other home network components such as game consoles 20, personal computers 22, personal digital assistants (PDAs), cameras, etc. over a wired or wireless home network 24. A TV system 18 may include a TV 26 with TV display 28 such as a flat panel standard definition/high definition (HD) display for presenting TV programming under control of a TV processor 32. The TV programming is typically received from a source 34 of TV programming such as a cable head end, satellite dish, terrestrial TV broadcast receiver, etc. through a TV tuner 36. The TV processor 32 may access one or more computer-readable media 30 such as disk-based media or solid state media that can store data and logic executable by the processor to undertake present principles. The TV may communicate with the wide area network 14 using a network interface 38 such as but not limited to an Ethernet card or a modem.

Additionally or in lieu of providing present principles internally to the TV, the TV system 18 can include a set box 40 that may be internal to the TV or externally housed from the TV and connected thereto. The set box 40 may include a set processor 42 accessing one or more computer readable media 44 for undertaking present logic. The set box 40 may also have a network interface 46 for communicating with the wide area network 14. A wireless remote control 48 may be provided for inputting user commands to the TV system 18, the set box 40, and other home network components.

Figure 2:
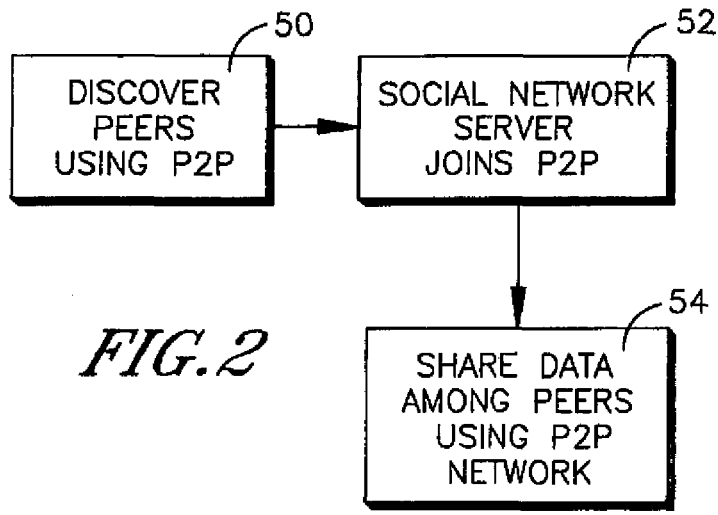
FIG. 2 is a flow chart of example logic in accordance with present principles.

Now referring to FIG. 2, at block 50 when a TV system 18 detects that it is connected to either its home network 24 or to the wide area network 14, it executes P2P discovery of other TV systems 18 using standard P2P network protocols, thus commencing the establishment of a specific (to compliant TV systems 18) P2P network infrastructure. At block 52 the social networking website hosted by the server 16 can also be added to the P2P network to serve as a publishing and announcing tool, while the data contents will be stored locally in home network (e.g., a PC joining the P2P network, as well as TV systems with sufficient storage capacity.

At block 54, using the P2P framework established above, users with common interest can establish a social P2P network with each other to share video/audio contents, create personalized channels and help to distribute large size HD content (e.g., premium content downloading). The P2P communication and resource discovery technologies can be implemented by, e.g., Bit-Torrent. Other software platforms such as Java-based JXTA can also be used. In establishing a social network, a network name may be established for a published interest genre and then users can view the published information and decide whether to join that particular social network. As many social networks based on interest may be established as dictated by the constellation of users.

Figure 3:
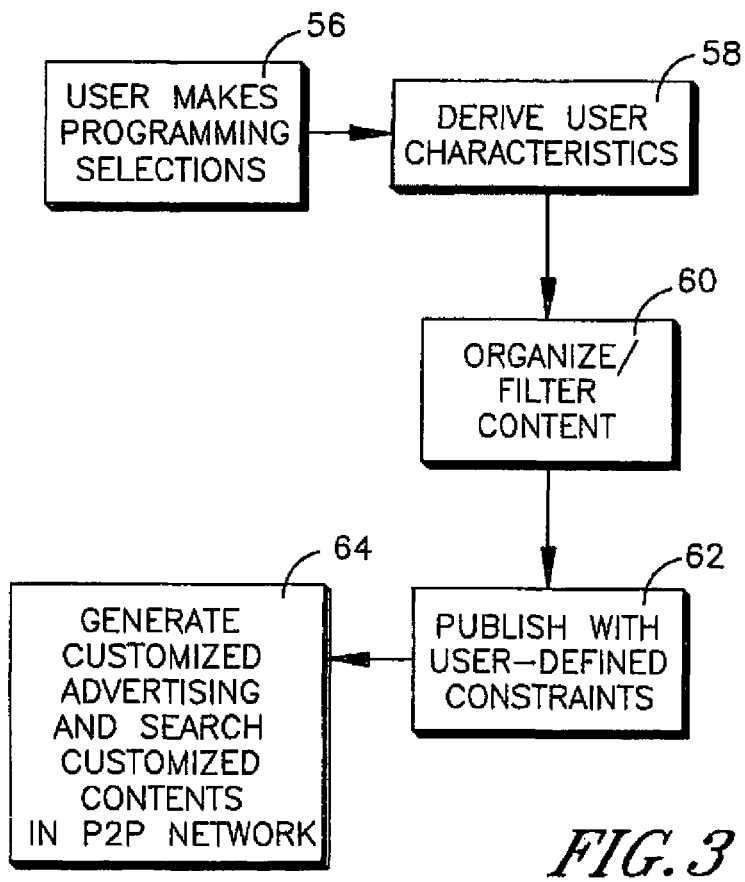
FIG. 3 is a flow chart of additional example logic in accordance with present principles.

As part of sharing content at block 54, reference is now made to FIG. 3, which illustrates principles of an example non-limiting data mining logic. At block 56 a user makes programming selections by, e.g., manipulating the remote control 48 to change TV channels, choose favorite online videos from a website, etc. These user behaviors are captured by the TV and input to a data mining engine. The data mining engine may be any suitable processor-executable engine that can derive user characteristics, i.e., user likes (and dislikes) at block 58. For example, if a user routinely watches sports channels the engine can associate the user's TV system 18 with "sports" but not with subjects that might be routinely shown on non-viewed channels or websites.

At block 60, using the characteristics at block 58 content is classified, analyzed, and predictions can be made as to future user behaviors/preferences. These policies can change dynamically as additional user input is received for organizing and filtering contents in the P2P social network and guiding the process to publish, at block 62, a user's interest to share a user's existing contents in the network (on, e.g., the social network server 16) using P2P sharing principles. User defined policies can also be added to further customize the publication rules. The user interest and content can be published in meta data format using XML to form special personalized channels which can be made to appear in a "content" section of a user interface presented on the TV display 28, e.g., on a cross-menu bar (XMB) user interface.

The data on the user and the user's viewed content thus may be shared in the P2P network (or even can be published in a common social networking website if a user prefers). Gracenote software can further assist in tagging various audio/video content. The user behavior captured by the data mining engine can also be used for generating customized advertisements for the user at block 64. With such a targeted approach, the advertisement can have a greater impact on the intended audience.

As recognized herein, different models for user authentication and accessibility to the shared content may be implemented. Most content can, be openly shared between peers. However, premium content or "unlisted" may require special ways to access. Users may share a link to their content via their social networking page allowing anyone to get the content without needing to authenticate. On the other hand, an invitation based content sharing can be used to restrict the access to the shared content. Files meant only for predetermined devices (e.g., automated software update) can require the predetermined devices to satisfy certain minimum requirements (e.g., firmware update for particular model of TV). Premium content such as digital rights management (DRM)-protected content can be shared in the P2P network only if all the members of a common group pass the security authentication for displaying such content. The social networking channel can be utilized not just by home users but by larger content providers to share movies or TV programs and generate advertising data based on user's habits.

Thus, user content access behavior is based on video content and social website access through network-capable TVs. Those contents include: (1) local sharing by the home area network (e.g. through digital living network alliance (DLNA), playing on TVs video/audio contents stored in another storage device such as a game console or PC); (2) free content that is accessed using Internet; (3) premium content for purchasing by user remote click (e.g., Amazon, NetFlix, etc. which provide DRM encrypted premium content for streaming directly to P2P TVs).

The data mining engine accordingly compiles and analyzes these user behaviors as well as the video/audio meta data (e.g., descriptions), so that automatic contents can be generated/linked (such as news related to the videos, stories and actors; new movie trailers falling in the previously purchased video category; new friends who also use the P2P networks and have common interests with the user). The resulting interest-based information can be published, obtained and exchanged through existing social network websites.

Accordingly, a relationship exists between user preferences mined as described and the P2P network. Specifically, all P2P user preferences are captured and shared (adhering to both auto-generated and user defined rules if desired) in the distributed P2P network. In other words, TV systems 18 which connect to the Internet can automatically look for other P2P-enabled TVs and build/join an infrastructureless P2P network, such that no explicit Internet servers are required to maintain those relationships. However, if desired centralized servers can be used for account management and content distribution purposes.

The P2P network can also be used to distribute large size premium contents to reduce server load. These contents can be streamed using P2P among users and can be cached locally for future P2P distribution purposes. Other TV systems 18 can quickly gather these contents piece by piece without going through a server, which nonetheless may still be used for DRM license management.

Consequently, most content can be openly shared between P2P network members. However, for private/protected content, different models of authenticating and access permission may be established as described above. Private content can be either shared based on an explicit invitation from the initial user who shares it or it could be based on certain access criteria that a group satisfies (multicast content). Protected content (like DRM) requires proper certificates to get the content.

Accordingly, with the above in mind it may now be appreciated that present principles provide TV system users with relevant contents, use data mining algorithm to generate customized content and increase business and revenue of web sites through target advertising, and distribute large high definition and long-form contents with minimal bandwidth constraints using P2P technology such as Bit Torrent. Also, availability is provided to target audiences exactly when they need it (timely availability) and delivered exactly when they want it (on-demand delivery). Furthermore, content is managed especially when a certain level of content security needs to be established due to the nature of the content, and users are engaged to share and invite more friends to join the P2P community. Web site "stickiness" is augmented to increase revenue by monetizing replaceable content, and communities of P2P users can create new channels and new forms of content.

While the particular SOCIAL NETWORKING AND PEER TO PEER FOR TVS is herein shown and described in detail, it is to be understood that the subject matter which is encompassed by the present invention is limited only by the claims.

What is claimed is:

1. System comprising at least one processor accessing instructions on at least one computer storage to configure the processor to:

execute a peer to peer (P2P) application promoting a social network by allowing a device connecting to a network to share content and create common interest channels with systems outside the home network using P2P communication such that support from wide area network infrastructure is not required;

the P2P application allowing users to join or leave the social network at will, wherein a participant tuning into a broadcast received by the system receives a video stream and also uploads the video stream using P2P communication to other participants in the social network to facilitate the other participants watching the program, wherein users in the social network provide a link to their content via their social networking page allowing anyone to get first content without needing to authenticate such that the first content is openly shared between peers, and wherein to share second premium content a user must send an invitation to other users to share the premium content to restrict access to the premium content, the premium content being protected by digital rights management (DRM) being shared in the social network only if all the users of a common group in the social network pass DRM security authentication for displaying premium content such that the social network is used not just by home users but also by relatively larger content providers to share movies or video programs and generate advertising data based on habits of users in the social network.

2. The system of claim 1, wherein the processor is in a TV.

3. The system of claim 1, wherein the processor is in a set box housed separately from a TV and connected thereto.

4. The system of claim 1, wherein the instructions when executed by the processor configure the processor for accessing a data mining engine to generate targeted advertising based on output from the data mining engine, the engine receiving user channel and web site selections.

5. The system of claim 4, wherein a relationship exists between user selections and the social network in that P2P user preferences are captured and shared in a distributed social network.

6. The system of claim 1, wherein systems connecting to a wide area computer network automatically seek other P2P-enabled systems and in concert therewith build/join an infrastructureless P2P social network, such that no explicit Internet servers are required to maintain the social network.

7. System comprising at least one processor accessing instructions on at least one computer instruction device to connect to a wide area computer network and automatically seek peer to peer (P2P)-enabled audio video systems and in concert therewith build/join an infrastructureless P2P social network, such that no explicit Internet servers are required to maintain the infrastructureless P2P social network, the system including at least one display controlled by the processor, the instructions when executed by the processor configuring the processor for receiving user programming selections from a remote control, the instructions when executed by the processor configuring the processor for executing a data mining engine to derive user preferences including one or more preferred video genre, the instructions when executed by the processor configuring the processor for publishing the user preferences derived from the data mining engine as well as at least one existing audio video content of the user available to the processor in the infrastructureless P2P social network, the user preferences and content being published in meta data format to establish special personalized channels made to appear in a "content" section of a user interface presented on the display, wherein users in the infrastructureless P2P social network provide a link to their content via their social networking page allowing anyone to get first content without needing to authenticate such that the first content is openly shared between peers, and wherein to share second premium content a user must send an invitation to other users to share the premium content to restrict access to the premium content, the premium content being protected by digital rights management (DRM) being shared in the infrastructureless P2P social network only if all the users of a common group in the infrastructureless P2P social network pass DRM security authentication for displaying premium content such that the infrastructureless P2P social network is used not just by home users but also by relatively larger content providers to share movies or video programs and generate advertising data based on habits of users in the infrastructureless P2P social network.

8. The system of claim 7, wherein the instructions when executed by the processor configuring the processor to executes a P2P application promoting the infrastructureless P2P social network by allowing a video device connecting to either a home network or Internet to share content and create common interest channels with systems outside the home network using P2P communication such that support from wide area network infrastructure is not required;

the P2P application allowing users to join or leave the infrastructureless P2P social network at will, wherein a participant tuning into a broadcast received by the system receives a video stream and also uploads the video stream using P2P communication to other participants in the infrastructureless P2P social network to facilitate the other participants watching the program.

9. The system of claim 7, wherein the processor is in a TV.

10. The system of claim 7, wherein the processor is in a set box housed separately from a TV and connected thereto.

11. The system of claim 7, the instructions when executed by the processor configuring the processor for accessing a data mining engine to generate targeted advertising based on output from the data mining engine, the engine receiving user channel and web site selections.

12. The system of claim 11, wherein a relationship exists between user selections and the infrastructureless P2P social network in that P2P user preferences are captured and shared in a distributed P2P network.

\* \* \* \* \*